United States Patent [19]
Boyle

[11] Patent Number: 5,597,228
[45] Date of Patent: Jan. 28, 1997

[54] AQUARIUM LANDSCAPE SYSTEM

[76] Inventor: Daniel Boyle, 101 Earle Ave., Lynbrook, N.Y. 11563

[21] Appl. No.: 475,468

[22] Filed: Jun. 7, 1995

Related U.S. Application Data

[63] Continuation-in-part of Ser. No. 408,896, Mar. 22, 1995, abandoned.

[51] Int. Cl.$^6$ ................................................. F21V 33/00
[52] U.S. Cl. .................... 362/101; 362/32; 362/253; 362/806; 119/267
[58] Field of Search .................... 362/101, 32, 253, 362/806; 119/267, 246, 248, 253, 256

[56] References Cited

U.S. PATENT DOCUMENTS

| | | | |
|---|---|---|---|
| 3,563,204 | 2/1971 | Szilagyi | 119/267 |
| 3,749,901 | 7/1993 | Clough | 119/267 |
| 3,908,598 | 9/1975 | Jewson | 119/267 |
| 4,081,666 | 3/1978 | Roehrick | 362/253 |
| 5,067,059 | 11/1991 | Hwang | 119/267 |
| 5,165,778 | 11/1992 | Matthias et al. | 362/800 |
| 5,211,469 | 5/1993 | Matthias et al. | 362/800 |

*Primary Examiner*—Stephen F. Husar
*Assistant Examiner*—Alfred Basichas
*Attorney, Agent, or Firm*—Collard & Roe, P.C.

[57] ABSTRACT

An aquarium landscape system provides a landscape partition enabling the creation of multiple different terrain levels within the aquarium. An internal illumination system is shown having a light assembly underneath the glass bottom of the aquarium and light carrying tubes within the aquarium for carrying the light from the bottom of the tank to the bottom of one or more of the decorative structures within the tank, thereby internally illuminating the decorative structure. In another embodiment of the invention, the exterior surface of the decorative structures within the aquarium is illuminated with a spot light effect. The color of the internal and exterior illumination of the decorative structures can be changed individually for each structure, or can be changed for all structures.

20 Claims, 7 Drawing Sheets

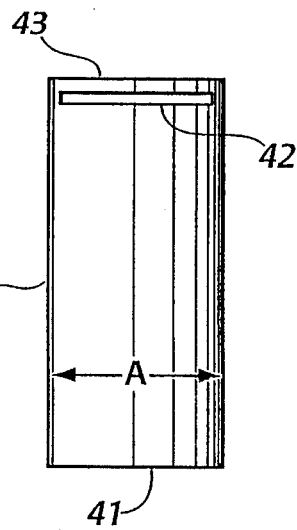
Fig. 6a
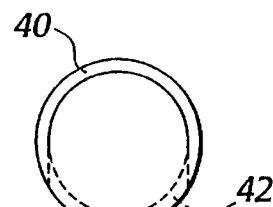
Fig. 6b
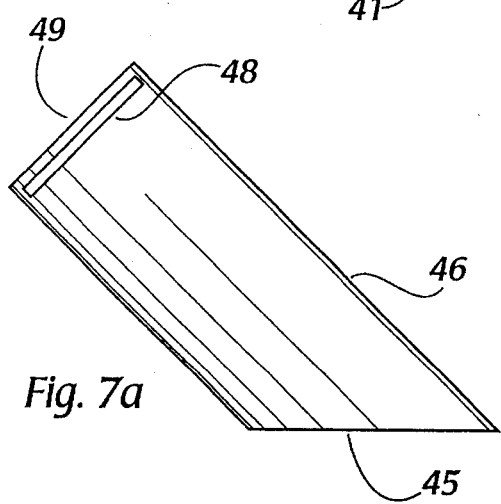
Fig. 7a
Fig. 7b
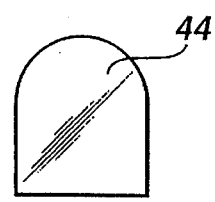
Fig. 8a
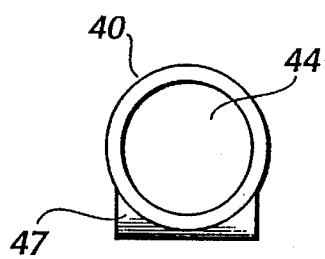
Fig. 8b
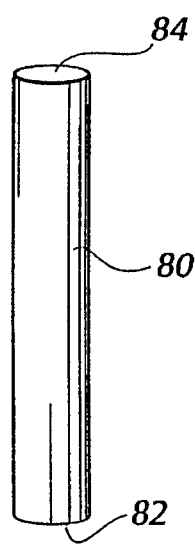
Fig. 9
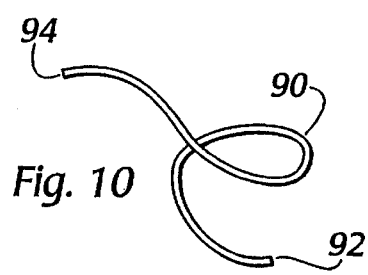
Fig. 10

US 5,597,228

AQUARIUM LANDSCAPE SYSTEM

This application is a Continuation-in-Part of U.S. patent application Ser. No. 08/408,896 filed Mar. 22, 1995, abandoned.

BACKGROUND OF THE INVENTION

1. Field of the Invention

The present invention relates to aquariums. More particularly, it relates to a landscape and lighting system for aquariums.

2. The Prior Art

The current landscape systems for aquariums range from multi-colored gravel to the addition of plastic scenic lay-overs which fit on the back of the aquarium or within the aquarium against the back side. These methods of providing scenery for the aquarium are relatively inexpensive, but are cheap in appearance. Furthermore, the lighting systems of the aquariums available today only provide a light source at the top of the tank. Thus, these systems do not enable the creation of multiple terrain levels within the aquarium, nor can they provide internal illumination of the decorative structures within the tank.

SUMMARY OF THE INVENTION

The present invention provides an aquarium landscape system which enables the creation of multiple terrain levels within the aquarium, and also allows the user to internally illuminate one or more of the decorative structures on any of the created terrain levels.

According to the invention, a clear partition is situated within an aquarium and is secured between two opposite walls thereof in a bowed configuration. A light assembly, mounted underneath and adjacent the bottom of the aquarium, provides light to the aquarium from the bottom. A variety of light carrying tubes are then situated within the gravel of the aquarium and extend from the bottom of the tank to the bottom of a decorative structure within the tank. The light carrying tubes carry the light from the bottom source to the interior of the decorative structure. Color changing means are provided for changing the color of light received by the decorative structures, either individually or all at once.

In another embodiment of the invention, other light carrying tubes enable the illumination of the exterior of a decorative structure from within the tank and provides a spot light effect within the aquarium.

It is therefore an object of the present invention to provide an aquarium landscape system that enables the creation of multiple terrain levels within the aquarium.

It is another object of the invention to provide an aquarium landscape system which can internally illuminate the decorative structures within the aquarium.

A further object of the invention is to provide an aquarium landscape system which enables the illumination of the exterior surface of a decorative structure with a spot light effect.

It is yet another object of the invention to provide an aquarium landscape system where the colors of the light for the illuminated structures can be changed individually for each structure or entirely for all structures.

Another object of the invention is to provide an aquarium landscape system that is easy to use and inexpensive to manufacture.

BRIEF DESCRIPTION OF THE DRAWINGS

Other objects and features of the present invention will become apparent from the following detailed description considered in connection with the accompanying drawings which disclose an embodiment of the present invention. It should be understood, however, that the drawings are designed for the purpose of illustration only and not as a definition of the limits of the invention.

In the drawings, wherein similar reference characters denote similar elements throughout the several views:

FIG. 6a is an elevational view of a first embodiment of a light carrying tube according to the invention;

FIG. 6b is a top view of the light carrying tube of FIG. 6a;

FIG. 7a is an elevational view of a second embodiment of the light carrying tube according to the invention;

FIG. 7b is a bottom view of the light carrying tube of FIG. 7a;

FIG. 8a is a color changing wafer according to the invention;

FIG. 8b is a top view of the color changing wafer of FIG. 8a as mounted within a light carrying tube according to the invention;

FIG. 9 is a third embodiment of a light carrier according to the invention;

FIG. 10 is a fourth embodiment of a light carrier according to the invention;

DETAILED DESCRIPTION OF PREFERRED EMBODIMENTS

Figure 1:
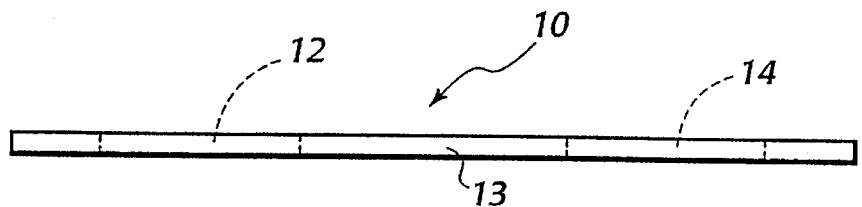
FIG. 1 is a top view of the landscape partition according to the invention.
Figure 3:
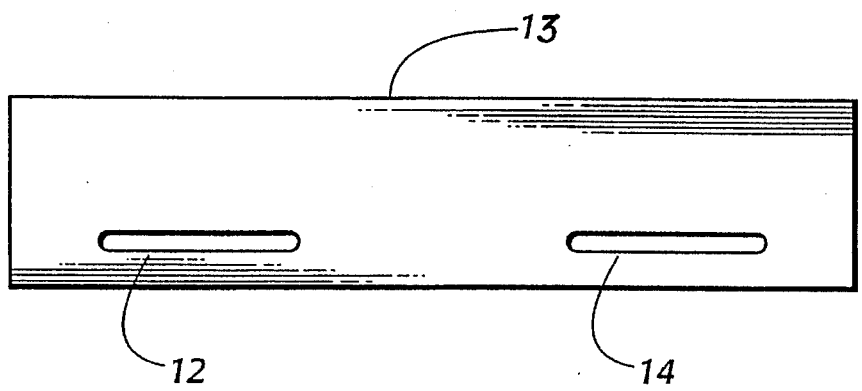
FIG. 3 is an elevational view of the landscape partition according to the invention.

Turning now in detail to the drawings, FIG. 1 shows the landscape partition 10 according to the invention. Partition or fence 10 is made from plexi-glass or any other suitable known flexible material. Partition 10 includes elongate openings 12 and 14 disposed near the bottom thereof (FIG. 3) for allowing the passage of air, filter or other lines through the partition. Partition 10 can be transparent or translucent.

Figure 2:
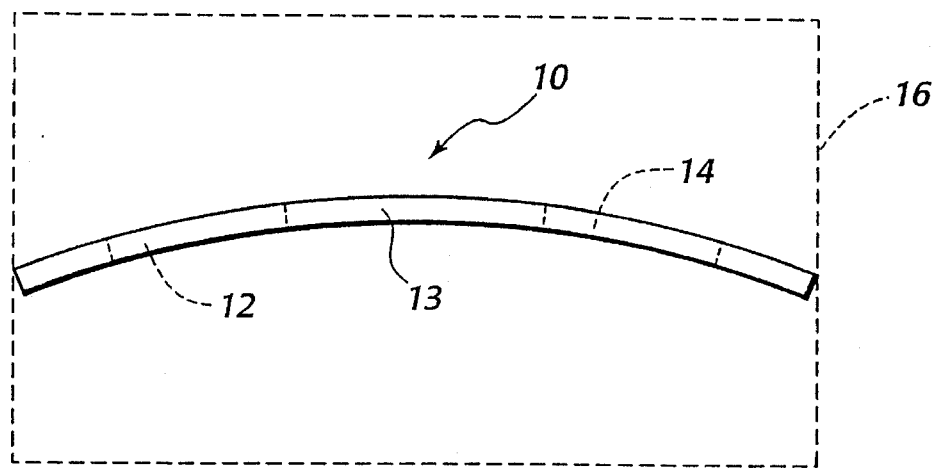
FIG. 2 is a top view of the landscape partition as mounted within an aquarium according to the invention.

FIG. 2 shows partition 10 as mounted within an aquarium 16. Partition 10 has a length slightly longer than the length of the aquarium and is therefore disposed in a bowed configuration. Partition 10 enables the creation of multiple terrain levels within the aquarium. (FIG. 11) Landscape partition 10 has a preferable height of approximately 25% of the height of the aquarium, but can have various heights to suit the needs of the user. Multiple partitions can be added to one aquarium to provide three or more different terrain levels.

Figure 11:
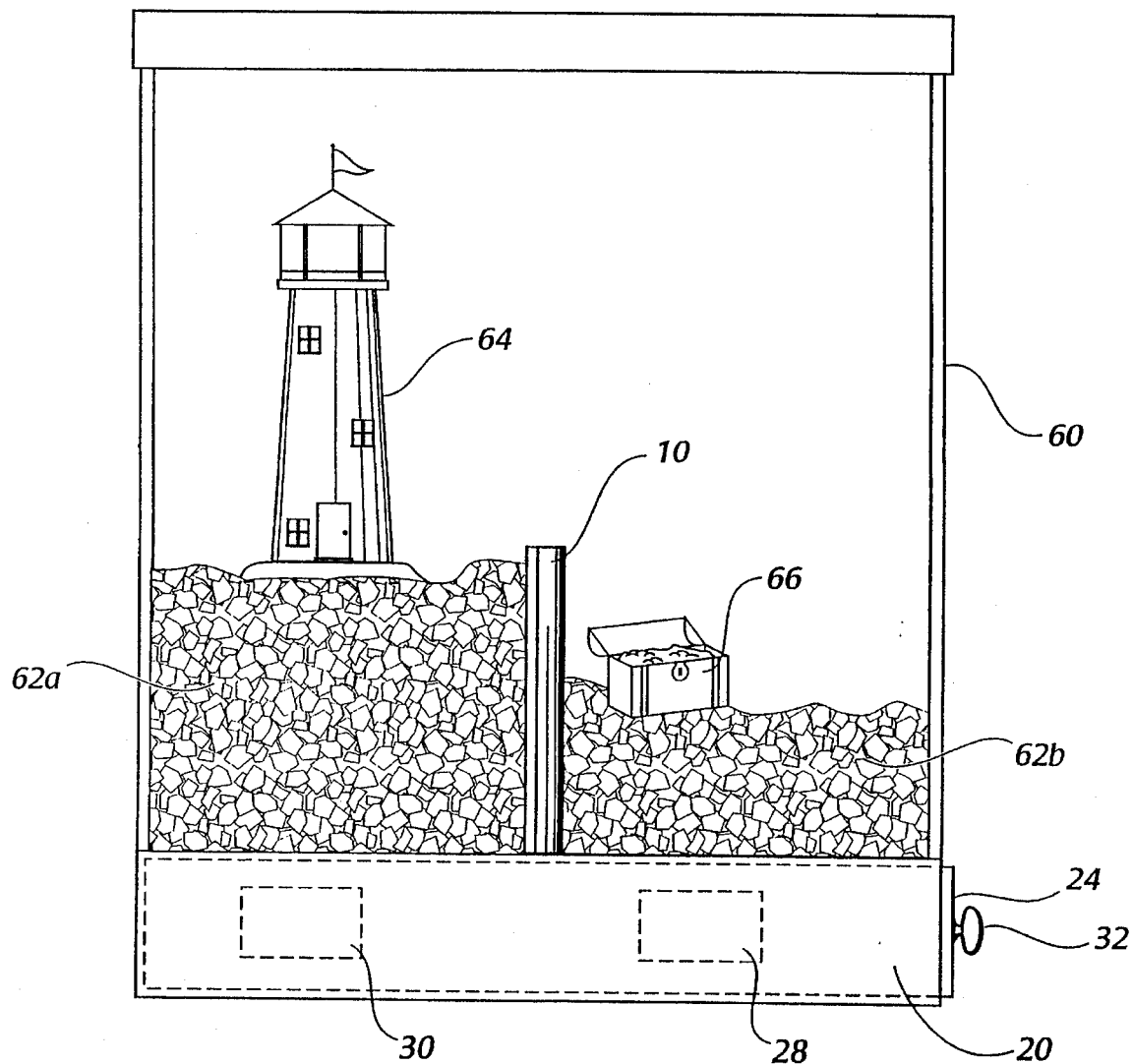
FIG. 11 is an elevational view of an aquarium with the landscape partition of the present invention.

FIG. 11 shows the partition 10 as disposed within aquarium 60. Aquarium 60 has two terrain levels of gravel 62a and 62b as separated by partition 10, and rests directly on lighting assembly 20 which is disposed thereunder.

The top 13 of partition 10 (FIGS. 1–3) emits light that is carried through said partition from lighting assembly 20. Although not a significant amount of light is emitted, this can be prevented by placing tape or other type of cover along the top 13 of partition 10. Partition 10 can be made to any size to accommodate any size aquarium.

Figure 4:
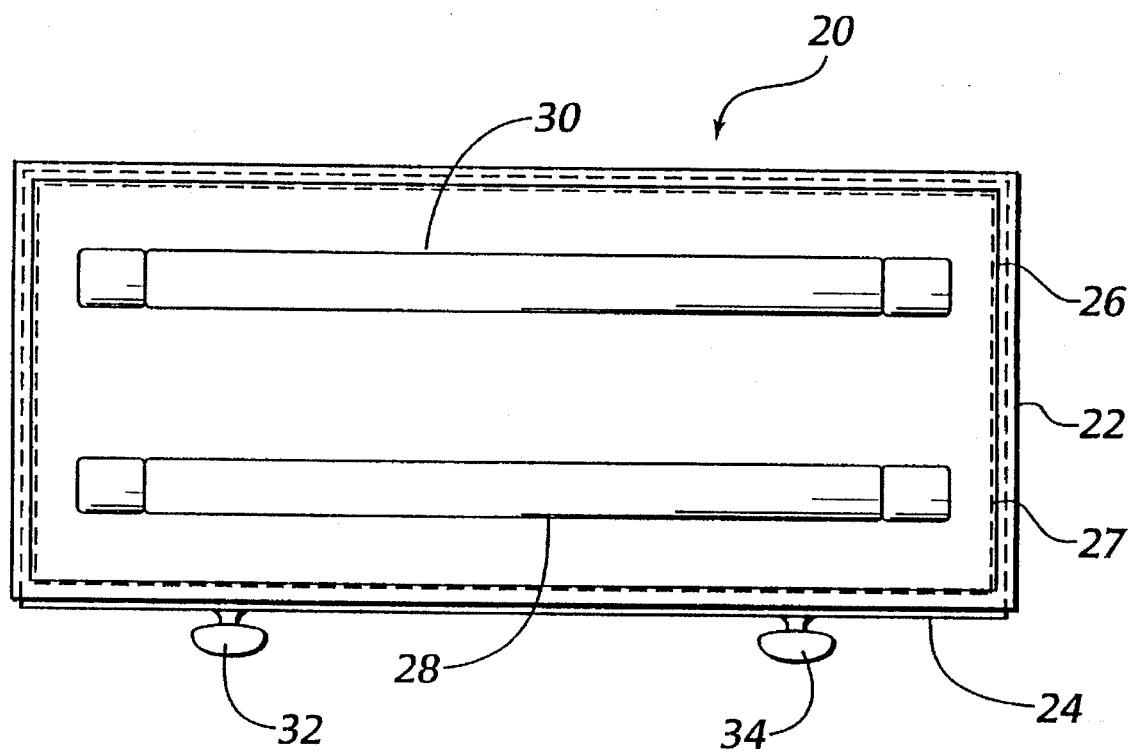
FIG. 4 is a top view of an embodiment of the lighting assembly according to the invention.

FIG. 4 shows an embodiment of lighting assembly 20 according to the invention. Lighting assembly 20 consists of a frame 22 having a lip 26 around the top thereof. A drawer 24 slidably engages frame 22 and has lights 28 and 30 mounted therein. Lights 28 and 30 are preferably fluorescent bulbs, but can be light bulbs of any suitable known type. The top of frame 22 can be covered by a piece of glass or can be open thereby leaving bulbs 28 and 30 exposed to the bottom of the aquarium. Drawer 24 is preferably lined with a reflective material such as mirrors to enhance lighting ability.

Lighting assembly 20 is disposed underneath an aquarium, and preferably has the aquarium sitting directly on the top thereof. Lighting system 20 can be made in any size to accommodate any size aquarium. Thus, the entire aquarium is being supported by the entire lighting assembly. The spacing of bulbs 28 and 30 is preferably such that each bulb is situated under a different terrain level within the aquarium (see FIG. 11). The number of bulbs within lighting assembly 20 can be changed depending on the application and lighting desired.

Figure 5:
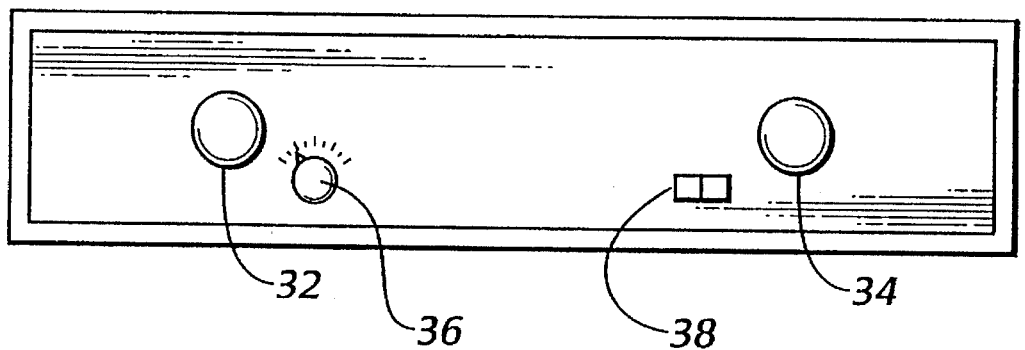
FIG. 5 is a front elevational view of the lighting assembly according to the invention.

FIG. 5 shows a front view lighting assembly 20 with drawer 24 having knobs 32 and 34 for opening said drawer. Switches 36 and 38 are provided on the front of drawer 24 and can be manual or timer operated switches or buttons.

In another embodiment of the invention, the open top of lighting assembly 20 can be covered with a transparent color sheet 27. The transparent color sheet will change the color of the light before it is transmitted through the light carriers.

Figure 12:
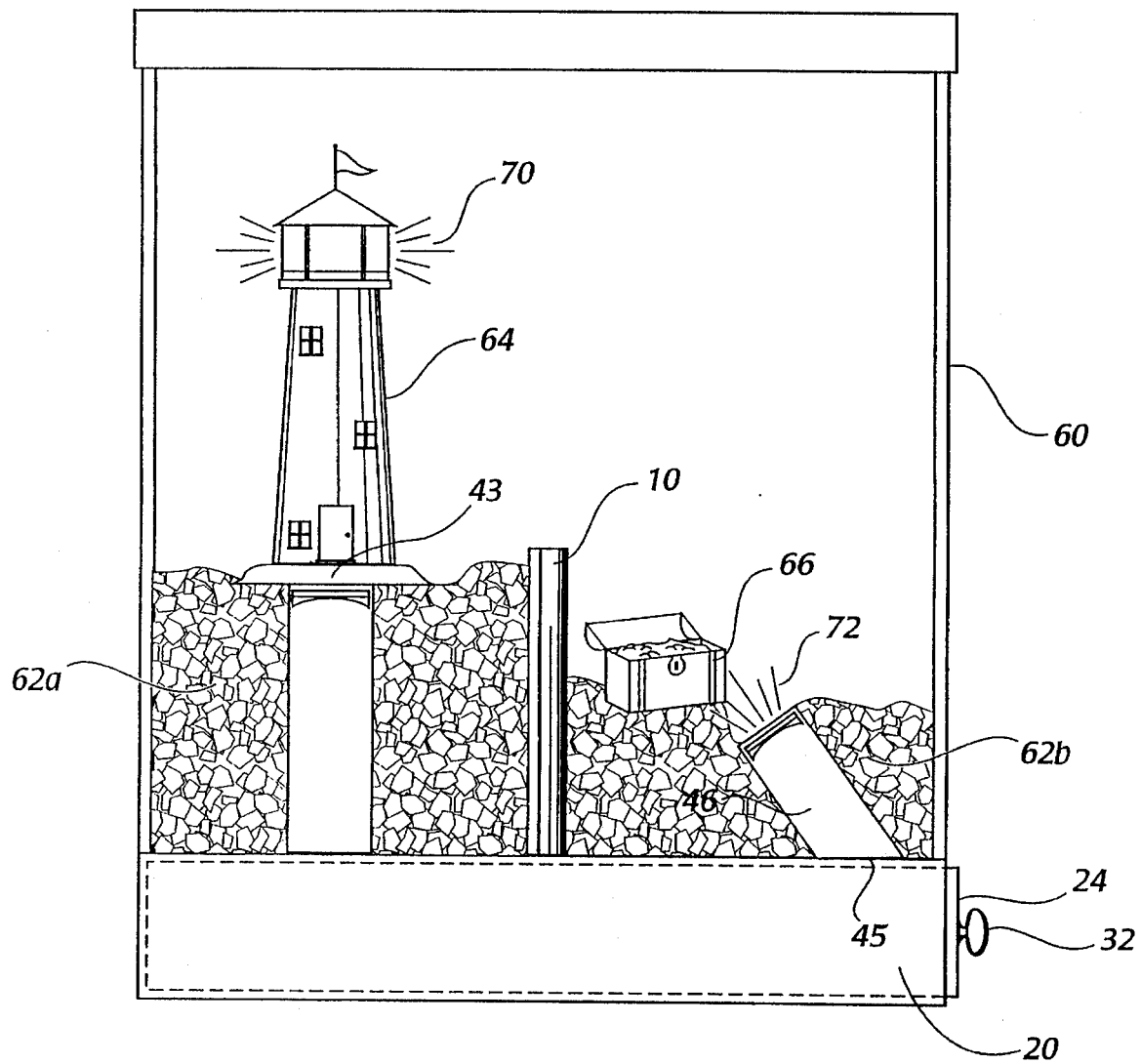
FIG. 12 is a partial cross-section view of an aquarium having a lighting system according to the invention.

FIG. 6a shows a first embodiment of a light carrying tube 40 according to the invention. Light carrying tube 40 has a slot 42 near the top thereof for receiving color changing wafers 44 (FIG. 8a). The bottom 41 of light carrying tube 40 rests on the bottom of the aquarium and the top 43 is disposed directly beneath a decorative structure 64 within the aquarium (FIG. 12). Thus, light from lighting assembly 20 is transmitted through light carrying tube 40 and into decorative structure 64 such that light 70 is emitted therefrom.

FIG. 7a shows a second embodiment of a light carrying tube 46 according to the invention. In this embodiment, the bottom 45 of tube 46 has been cut on an angle to provide a larger opening for receiving light. The bottom. 45 of tube 46 rests on the bottom of the aquarium and carries the light generated by light assembly 20 to the top 49 thereof. Tube 46 can be positioned in front of a decorative structure 66 and act light a spotlight by emitting localized light 72 onto the outer surface of structure 66 (FIG. 12). There is no limitation as to the application of light carrying tubes 40 and 46 and the kind of structures they can be used to illuminate.

The inside surface of tubes 40 and 46 are preferably white for providing the greatest reflection of the light through said tubes. The exterior surface of the tubes 40 and 46 can be any suitable color. Tubes 40 and 46 can be made of plastic or any other suitable known type of material. The diameter A of tubes 40 and 46 can be changed depending on the desired application or structure involved.

FIG. 8a shows a color changing wafer 44 according to the invention. Slots 42 and 48 in tubes 40 and 46, respectively, receive color changing wafer 44 and thereby allows for changing the color of light received by each decorative structure individually. When color changing wafer 44 is mounted within a light carrying tube, the extended part 47 outside the tube will be covered by the gravel in the aquarium. If no color changing is desired, wafers 44 can be clear and will be inserted in their respective slots to prevent gravel and other debris from falling into the light carrying tube.

FIG. 9 shows a cylindrical light pipe 80 having a top 84 and a bottom 82. Light pipe 80 is a solid cylindrical tube having a specific color characteristic and which carries light from one end to the other without any significant loss of light through the body. As such, light pipe 80 can be used in place of light carrying tubes 40 or 46 depending on the particular application. Light pipe 80 is available in a variety of colors and thereby eliminates the use of color changing wafers as incorporated with tubes 40 and 46. Light pipe 80 can be a neon tube or any other suitable known type of light carrier having specific color characteristics. In another embodiment of the invention (not shown), the top 84 of light pipe 80 can extend into the decorative structure to further enhance the illumination effect. Moreover, cellophane or other light dispersing material can be disposed near the top 84 to disperse the light within the decorative structure and provide special lighting effects such as, for example, a burning fire.

FIG. 10 shows a fiber optic cable 90 having ends 92 and 94. Fiber optic cable 90 can be used to carry light generated by the light assembly to very small specific locations. For example, fiber optic cable 90 can be used to light a flashlight of a figurine scuba diver within the aquarium (not shown).

FIG. 12 shows aquarium 60 with the gravel 62 partially removed to show light carrying tubes 40 and 46 in position. The bottom 41 of light carrying tube 40 rests on the bottom of aquarium 60 and which rests on light assembly 20. Tube 40 carries the light through gravel 62 and into structure 64. On the other terrain level, tube 46 is situated in front of structure 66 such that the light 72 emitted therefrom is reflected off the face of structure 66. In this position, tube 46 acts like a spot light.

The gravel 62 within aquarium 60 can be any gravel of suitable known type, such as, for example, transparent gravel of various colors, non-transparent gravel, etc.

Figure 13:
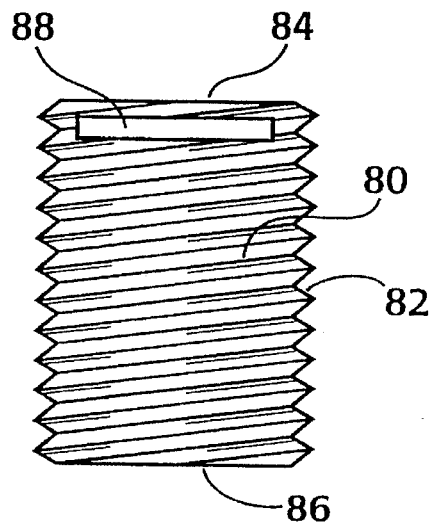
FIG. 13 is a front view of a threaded coupler of an adjustable light carrying tube according to the invention.
Figure 14:
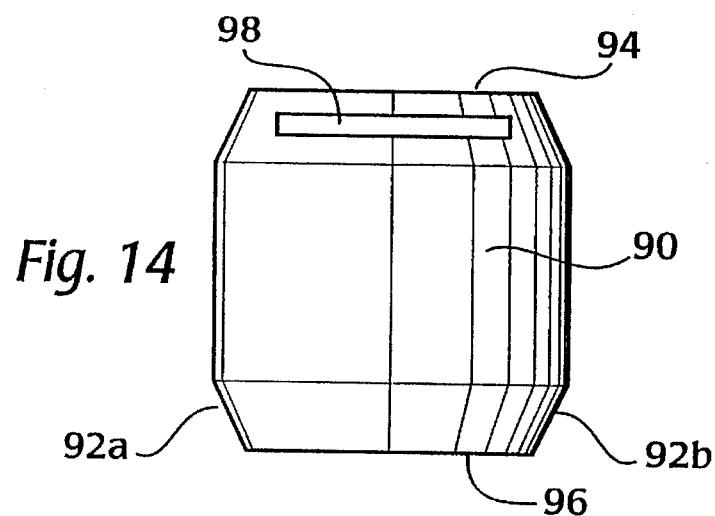
FIG. 14 is a front view of a receiving coupler of the adjustable light carrying tube according to the invention.
Figure 15:
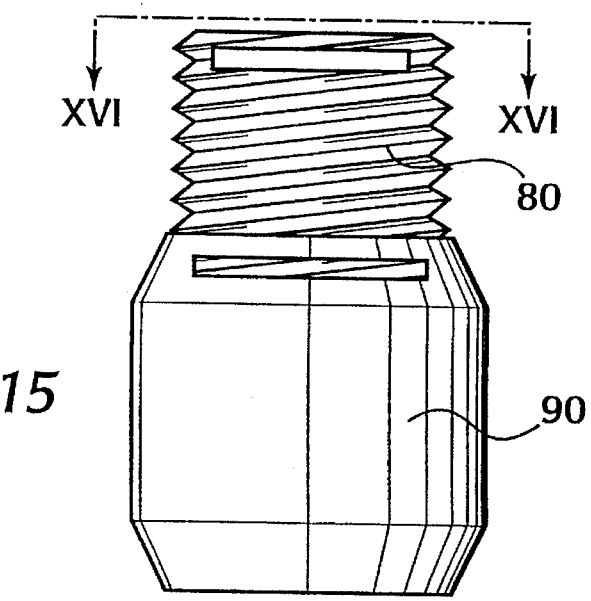
FIG. 15 is an elevational view of the adjustable light carrying tube according to the invention.
Figure 16:
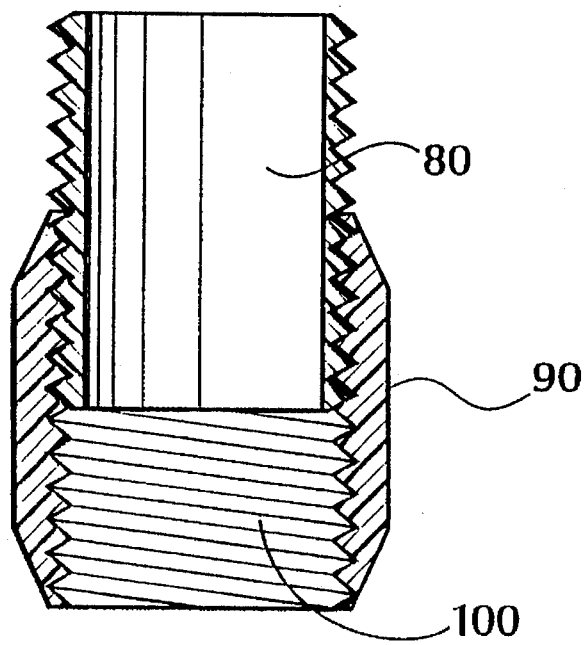
FIG. 16 is a cross-sectional view of the adjustable light carrying tube taken along line XVI—XVI of FIG. 15.

FIGS. 13 and 14 show a threaded light carrying tube 80 having external threads 82 and slot 88 for receiving a color changing wafer 44, and a light carrying tube 90 with slot 98 for receiving a color changing wafer 44. Light carrying tube 90 is internally threaded and receives threaded tube 80 to enable the adjustment in height of the light carrying tube. Tube 90 has beveled edges 92a and 92b to facilitate the insertion of tube 90 through the gravel in an aquarium. The threads FIG. 15 shows the coupled pair of threaded tube 80 and receiving tube 90. In this configuration, threaded tube 80 can be rotated in either direction to adjust the height of the entire combination. Slot 88 will remain in the top position to receive a color changing wafer. However, slot 88 may be disposed at the bottom according to user preference. FIG. 16 shows a cross section of the combination of FIG. 15 showing the internal threads 100 of receiving tube 90. The pitch of the threads can be adjusted to any size desired. The threads 100 and 82 can be replaced with any other suitable known type of adjustable coupling.

Figure 17:
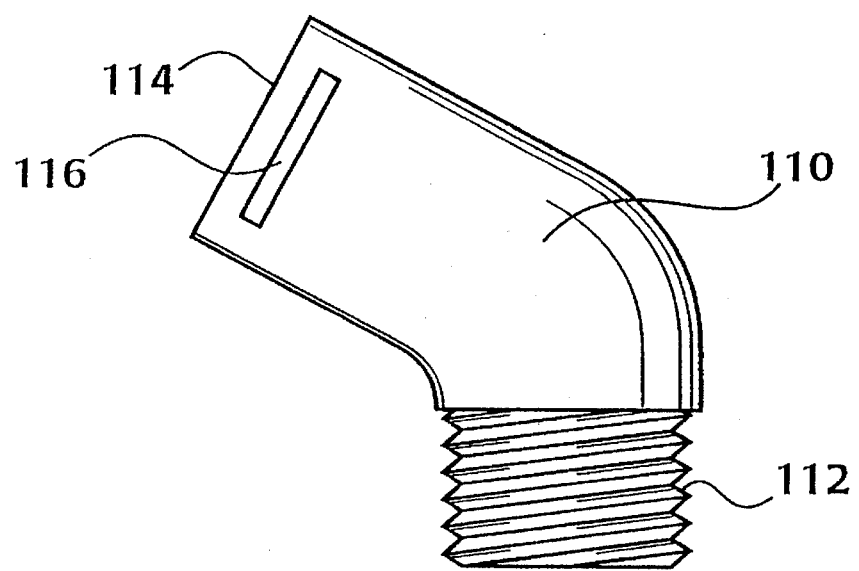
FIG. 17 is an angular adjustable light carrying tube according to the invention.

FIG. 17 shows an angular light carrying tube 110 having a threaded portion 112 and a slot 116 for receiving a color changing wafer. Threaded portion 112 is threaded into receiving tube 90 and adjusted to the desired height.

While several embodiments of the present invention has been shown and described, it is to be understood that many changes and modifications may be made thereunto without departing from the spirit and scope of the invention as defined in the appended claims.

What is claimed is:

1. An aquarium landscape system for glass or transparent aquariums having decorative structures and gravel, the decorative structures being hollow and having an exterior surface, the landscape system comprising:

at least one partition means disposed within the aquarium for creating at least one different terrain level therein, said at least one partition means comprising a board having a top and a bottom and extending from one side of the aquarium to the other, said bottom of the board resting on the bottom of the aquarium; and lighting means for illuminating at least one of the decorative structures within the aquarium.

2. The aquarium landscape system according to claim 1, wherein said lighting means internally illuminates the decorative structures within the aquarium.

3. The aquarium landscape system according to claim 1, wherein said lighting means illuminates the exterior surface of the decorative structures within the aquarium with a spot light effect.

4. The aquarium landscape system according to claim 1, wherein said board includes at least one opening near the bottom for allowing the passage of air and filter lines from one terrain level to the other.

5. The aquarium landscape system according to claim 1, wherein said lighting means comprises:

a light assembly disposed underneath the aquarium for generating light; and light carrying means disposed within the aquarium for carrying the light generated at the bottom of the aquarium through the gravel to at least one decorative structure within the aquarium.

6. The aquarium landscape system according to claim 5, further comprising color changing means for coupling to said light carrying means for changing the color of the light received by the decorative structures.

7. The aquarium landscape system according to claim 5, wherein said light assembly comprises at least one light bulb connected to an external power source and a switch for selectively switching said at least one light bulb on and off.

8. The aquarium landscape system according to claim 7, wherein said light assembly further comprises a timing circuit for automatically providing power to said at least one light bulb at a predetermined time.

9. The aquarium landscape system according to claim 5, wherein said light carrying means comprises:

a plurality of tubular members having a body with a bottom and a top, the bottom of said tubular members being disposed on the bottom of the aquarium and the top of said tubular members being situated directly underneath the decorative structures within the aquarium, the body of said tubular members being covered by the gravel contained within the aquarium.

10. The aquarium landscape system according to claim 5, wherein said light carrying means comprises:

a plurality of angular tubular members having a body with a bottom and a top, the bottom of said tubular members being disposed on the bottom of the aquarium and the top of said tubular members being angularly directed toward the exterior surfaces of the decorative structures within the aquarium to provide a spot light effect, the body of said tubular members being covered by the gravel contained within the aquarium.

11. The aquarium landscape system according to claim 5, wherein said color changing means comprises:

a colored transparent sheet disposed underneath the aquarium and above said light assembly, said colored transparent sheet changing the color of light received by all of said plurality of tubular members.

12. The aquarium landscape system according to claim 9, wherein said color changing means comprises:

a plurality of colored wafers and a notch in each of said plurality of tubular members, whereby one of said colored wafers fits into said notch in the tubular members and thereby changes the color of light fed into the decorative structure, and whereby said colored wafers and said notches enable the color of the light to be changed for each decorative structure independent of the color of light generated by the lighting assembly.

13. The aquarium landscape system according to claim 10, wherein said color changing means comprises:

a plurality of colored wafers and a notch in each of said plurality of angular tubular members, whereby one of said colored wafers fits into said notch in the tubular members and thereby changes the color of light fed into the decorative structure, and whereby said colored wafers and said notches enable the color of the light to be changed for each decorative structure independent of the color of light generated by the lighting assembly.

14. The aquarium landscape system according to claim 5, wherein said light carrying means comprises a cylindrical light pipe, said light pipe having different colors for different applications.

15. The aquarium landscape system according to claim 5, wherein said light carrying means comprises fiber optic cables.

16. The aquarium landscape system according to claim 4, wherein said light carrying means comprises an adjustable light carrying tube, the adjustable light carrying tube comprising:

at least one tubular member having a body with a bottom, a top and an interior surface;

at least one tubular insert having a body with a bottom, a top and an exterior surface, said exterior surface engaging said interior surface of said tubular member; and fastening means for adjustably coupling said exterior surface of said tubular insert with said interior surface of said tubular member to form a desired size.

17. The aquarium landscape system according to claim 16, wherein said fastening means comprises a threaded exterior surface of said tubular insert and a threaded interior surface of said tubular member.

18. The aquarium landscape system according to claim 17, further comprising color changing means for coupling to said tubular member and said tubular insert for changing the color of the light received by the decorative structures.

19. The aquarium landscape system according to claim 18, wherein said color changing means comprises:
   a plurality of colored wafers; and
   a notch in each of said tubular member and said tubular insert, whereby one of said colored wafers fits into said notch in the tubular insert and member and thereby changes the color of light fed into the decorative structure, and whereby said colored wafers and said notches enable the color of the light to be changed for each decorative structure independent of the color of light generated by the light assembly.

20. An aquarium landscape system for glass or transparent aquariums having decorative structures and gravel, the decorative structures being hollow and having an exterior surface, the landscape system comprising:
   at least one partition means disposed within the aquarium for creating at least one different terrain level therein, said at least one partition means comprising a board having a top and a bottom and extending from one side of the aquarium to the other, said bottom of the board resting on the bottom of the aquarium.

* * * * *